May 7, 1929.　　F. H. EHNTS　　1,711,491
LAUNDRY APPARATUS
Filed Feb. 14, 1924　　2 Sheets-Sheet 1
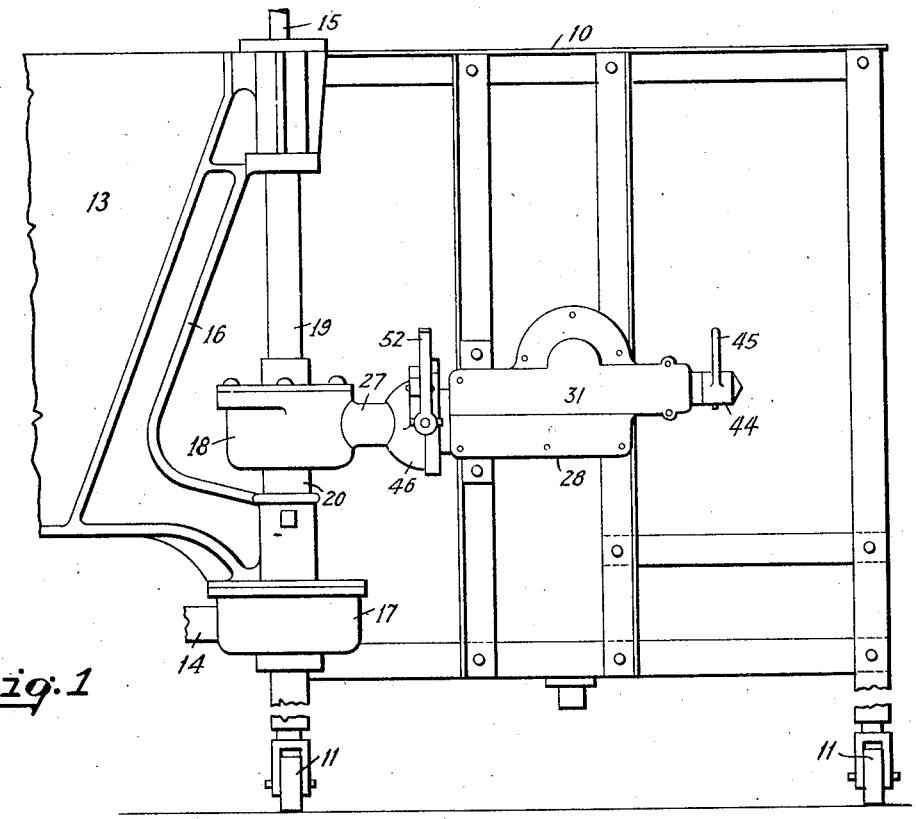
Fig. 1
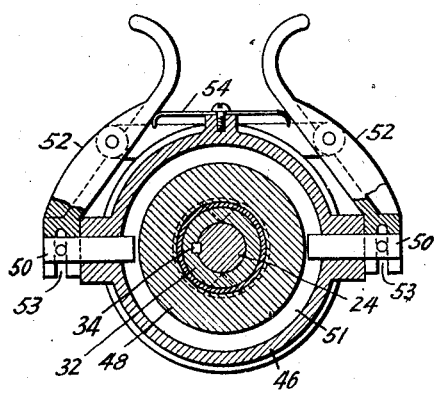
Fig. 4
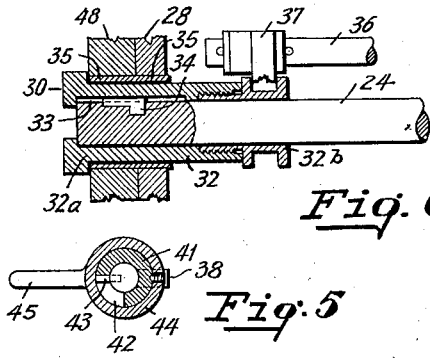
Fig. 6
Fig. 5
INVENTOR
Frederic H. Ehnts
BY
Duell, Warfield & Duell
ATTORNEY

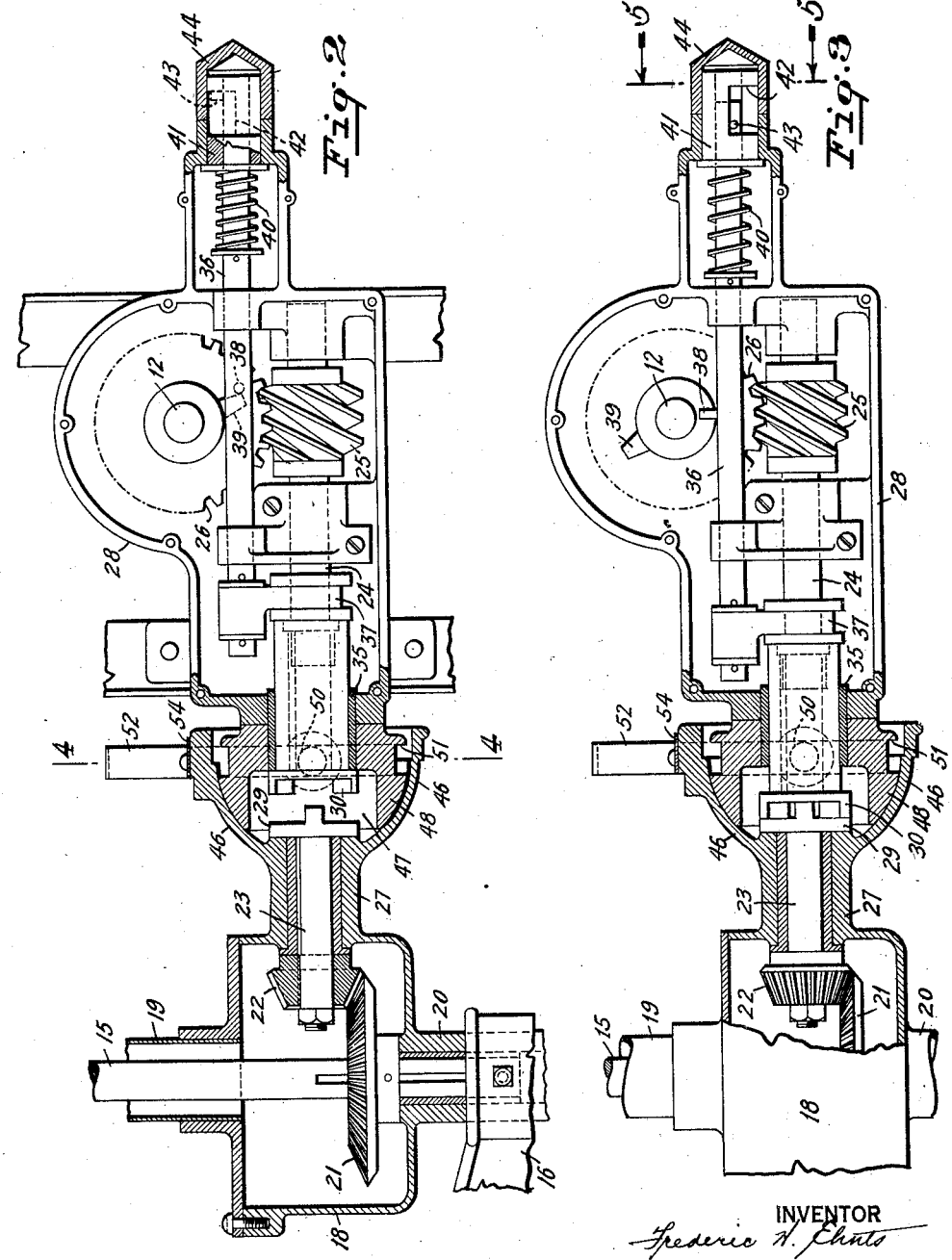

Patented May 7, 1929.

1,711,491

UNITED STATES PATENT OFFICE.

FREDERIC H. EHNTS, OF GERMANTOWN, PENNSYLVANIA, ASSIGNOR, BY MESNE ASSIGNMENTS, TO H. W. BUTTERWORTH & SONS COMPANY, A CORPORATION OF PENNSYLVANIA.

LAUNDRY APPARATUS.

Application filed February 14, 1924. Serial No. 692,739.

This invention relates to improvements in laundry machinery and with reference to some of its more particular details to improved power transmission and coupling connections for transmitting power to a driven or operative element of a laundry machine or the like.

It is a general object of the invention to improve and perfect, for more convenient operation and satisfactory service, power transmitting and coupling connections for the transmission of power between two machines, one of which may be portable, as a washing machine, and mounted for movement on its own supports.

A further and more particular object is to provide an improved detachable coupling arrangement, for the transmission of power from a power source to a portable machine, of such a nature as to steady and support the portable machine in coupled position for the transmission of power and to enable the power coupling and steadying connections to engage in properly mating positions despite small angular displacements of the portable machine with reference to the source of power, such as may be due to irregularities in the supporting surface, or failure to bring the parts in exact alignment.

A still further object of the invention is to provide coupling mechanism for laundry apparatus or the like including an improved and perfected arrangement for automatically stopping the driven element, such as the receiving cylinder of a washing machine, in a predetermined position.

Other objects will be in part obvious in connection with the following detailed description of an illustrative embodiment of the invention and will be in part pointed out in connection therewith.

The invention accordingly comprises the features of construction, combinations of elements, and arrangement of parts, which will be exemplified in the constructions hereinafter set forth and the scope of the application of which will be indicated in the claims.

For a complete understanding of the nature and objects of the invention, reference is had to the accompanying drawings showing a preferred embodiment of the invention, and in which:

Figure 1 is a side elevation showing a portable laundry machine coupled to a fixed power element in accordance with the invention;

Fig. 2 is an enlarged sectional view showing the connections for connecting the portable element to the power element, the power coupling or clutch being shown in disengaged position;

Fig. 3 is a view similar to Fig. 2, but showing the power coupling in engaged position;

Fig. 4 is a transverse section taken approximately on the line 4—4 of Fig. 2;

Fig. 5 is a section on the line 5—5 of Fig. 3 looking toward the left; and

Fig. 6 is a fragmentary view partly in section showing the connection of the movable power clutch member to the driving shaft.

Referring to the drawing for a complete disclosure of the embodiment of the invention there shown, a portable laundry machine, such for example as a washing machine, is shown at 10, being mounted upon standards with castors 11 so it may be pushed from place to place as desired upon the floor. The washer is provided with a washing element, such as a receiving drum (not shown), which is arranged for operation by a driven element which as shown may be in the form of a shaft 12. Preferably the portable machine is not fitted with a source of power, but power transmission connections are provided for transmitting power from an isolated source mounted on an independent unit. As illustrated, this independent unit may take the form of a laundry tray or tub 13, which is mounted in stationary position, a driving shaft 14 being mounted thereon and arranged to be driven by a suitable motor (not shown). An upright shaft 15 is mounted in bearings in brackets 16 of the laundry tray, power being transmitted thereto through gear connections housed within a gear casing 17. A swinging wringer (not shown) may be mounted at the upper edge of the laundry tray for driving from the shaft 15.

An upper gear casing 18 is also arranged on an upright column formed by the upright shaft 15 and upper and lower sleeve casings 19 and 20. The upper sleeve casing 19 is mounted for sliding movement in the upper bearing of the bracket 16, and the lower casing 20, which is preferably integral with the gear casing 18, is similarly slidably mounted in the lower bearing of said bracket. This arrangement permits the casing 18 to be adjusted upwardly and downwardly and it may be secured in adjusted position by a suitable setscrew or similar clamping means, such as indicated in Fig. 2. A bevel gear 21 is mounted on the shaft 15 within the casing 18, being constrained for rotation with the shaft but adjustable upwardly or downwardly with the casing 18, a suitable groove and lug arrangement being provided between the shaft and bevel gear for this purpose.

Power is transmitted from the bevel gear 21 to the driven element 12 of the portable machine through the power transmission connections, including a bevel gear 22 meshing with gear 21, a stub shaft 23, a driving shaft 24, a worm 25 and worm wheel 26 connected to the driven element 12. The shafts 23 and 24 are mounted respectively in housings or casings 27 and 28 carried by the stationary and portable machines, the casing 27 preferably being formed as an integral unit with the gear casing 18. The shafts are arranged for coupling together through a power coupling or clutch including clutch elements 29 and 30 mounted respectively on the shafts 23 and 24. A removable cover plate 31 is secured to the front of the casing or housing 28 in such a manner as to entirely enclose the operative elements to exclude effectually dirt and moisture. The clutch element 30 is carried by a sleeve 32 preferably made up in a plurality of sections 32ª and 32ᵇ threaded together, one section being grooved or splined internally to provide a key-way 33, extending preferably to the end of the section, while the other section is threaded within the first so the end thereof forms a terminal for the key-way 33. A circumferential groove is provided in one of the sleeve sections for the reception of an operating member for the clutch element. A key 34 is seated in a recess in the shaft 24, being forced therein with a tight fit so as to be held in its seat in position for engagement in the key-way 33. The sleeve 32 is provided with an external bearing surface engaging a bearing 35 mounted in the casing 28 for rotatably supporting the shaft 24. It will be seen that this construction provides a convenient means of assembly or disassembly of the clutch sleeve and its associated parts. When assembled a permanent connection is made, which is simple and effective and not likely to become disadjusted. The key 34 being held in its seat by reason of the tight fit can be placed in position before the shaft is mounted without danger of displacement during assembly of the parts.

A clutch operating rod 36 is mounted in bearings in the housing 28 for longitudinal and rotative movement, having a clutch fork 37 engaging in the circumferential groove of the clutch sleeve 32. The clutch operating rod is provided with a lug or pin 38 projecting from the side thereof and disposed, when the rod is in one position, to cooperate with a lug 39 projecting from the driven member 12. A compression spring 40 surrounds the clutch rod 36, being housed in a compartment of the transmission housing and tensioned to urge the rod into clutch closing position. The operating rod extends into a sleeve 41 rotatably mounted in a boss of the housing and having a slot 42 for the reception of a pin or lug 43 on the rod. An external cap 44 is secured to the sleeve and provided with a laterally projecting operating handle 45. Assuming the power clutch to be engaged as shown in Fig. 3, it will be seen from the foregoing description that turning the clutch operating rod through an angle of about 90° will bring the projecting pin or lug 38 into position to be contacted by the lug 39 which is rotating with the driven element 12. Contact of these two lugs will force the clutch operating rod 36 longitudinally against tension of spring 40 so as to move the clutch sleeve 32 and clutch element 30 to disconnect the clutch. The driven element, therefore, will always stop in a predetermined position, which in the case of the washing machine would be when the door of the receiving drum is in proper position for receiving or removing material. It will furthermore be noted that the spring 40 by the action just mentioned cushions the movement of the receiving drum and brings it gradually to a stop in the desired position. The axial dimension of the slot 42 of sleeve 41 is sufficient to permit axial clutch operating movement of the clutch operating rod, while the circumferential dimension thereof is sufficient to permit a certain idle rotary movement of the handle 45 before rotation of the rod 36 begins. This rotary slot permits about 90° of lost motion between the sleeve and operating rod so the handle 45 may lie in position to hold the operating rod by gravity in either the operative position or the non-operative position thereof. This gravity function of the operating handle 45 will be clear upon reference to Figs. 1, 2, 3, and 5 of the drawing. In Figs. 3 and 5 the clutch-operating rod 36 is in non-operative position, the handle 45 thereof then standing outwardly substantially horizontally toward the left in Fig. 5, whereby its weight tends to retain the operating rod in this position. When the handle 45 is moved to shift the clutch-operating rod 36 into position for automatic operation by the driven rotary member 12, it then occupies a position about 180° from the Fig. 5 position, being then also substantially horizontally positioned toward the right in Fig. 5 whereby the handle weight is exerted to retain the operating rod 36 in operative position. This construction provides a simple arrangement for assuring that the operating rod remains in the desired position.

The clutch or power coupling members 29 and 30 are housed respectively in a casing enlargement 46 and a recess 47 in a coupling head 48 for the casings; sufficient space being provided to permit coupling and uncoupling movement. The casing 46 is provided with an inner recess having a curved or spherical surface, and the coupling head 48 has a complementary exterior curved or spherical surface for mating with the spherical recess. When these complementary casing formations are in engaged position, the clutch parts 29 and 30 are supported in position for connection or disconnection, while due to the curved mating surfaces the casings may be moved into cooperating assembled positions despite slight angular displacement of the two machines, such as may occur when the supporting surface is inclined or irregular, or the portable machine has not been moved into correct aligning position. It will readily be understood that in cases where it is important to permit these angular displacements in one direction or one plane only, it will not be necessary to make the cooperating engaging faces spherical, but they may in such cases be cylindrical in form.

Differences in elevation of the coupling members, as pointed out above, may be compensated by the adjustable casings 18 and 27. For securing the transmission housings of the driving and driven elements in cooperative position, a locking means is provided. Such a locking means of preferred form is shown in the drawing, including locking pins 50 mounted in apertures in the casing enlargement 46, and arranged to be projected longitudinally into a circumferential groove 51 formed in the coupling head 48. Opposed pivoted levers 52 are connected with the locking pins through pin and slot connections 53 and the pins are normally projected into locking position by means of a double ended spring 54 in engagement with the ends of levers 52. The locking pins are readily moved from locking position by grasping the upper opposed curved ends of the levers 52. Due to the curved forward end of the coupling head 48, the locking pins will be automatically pushed outwardly against spring tension when the casing couplings are moved together so the locking takes place automatically.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device of the character described, in combination, a power transmission connection for transmitting power for operation of a portable machine and including a rotary driving element and a rotary driven element, one of which element is mounted upon said portable machine and movable therewith with respect to the other said rotary element so as to associate said driving and driven elements in power transmitting relation or to disassociate them, a power coupling included in said power connection and having interengaging coupling members, and a housing for said power coupling including complementary members adapted to be coupled together to support said coupling members in position for co-operation and having complementary curved surfaces adapted to permit relative angular displacement of said driving and driven elements while supporting the coupling members in position for driving engagement.

2. In a device of the character described, in combination, power transmission connections for transmitting power for operation of a portable machine and including a rotary driving element and a rotary driven element, one of which elements is mounted upon said portable machine and movable therewith with respect to the other said rotary element so as to associate said driving and driven elements in power transmitting relation or to disassociate them, a power coupling included in said power connection and having interengaging coupling members, a housing for said power coupling, including complementary members adapted to be coupled together to support said coupling members in position for co-operation and having complementary curved surfaces adapted to permit relative angular displacement of said driving and driven elements while supporting the coupling members in position for driving engagement, means for securing said complementary housing members in co-operative position and means on one of said rotary elements for automatically disconnecting said power coupling at a predetermined position of said driven element.

3. In a device of the character described, in combination, a power transmission connection for transmitting power for operation of a portable machine and including a rotary driving element and a rotary driven element, one of which elements is mounted upon said portable machine and movable therewith with respect to the other said rotary element so as to associate said driving and driven elements in power transmitting relation or to disassociate them, a power coupling included in said power connection and having interengaging coupling members, and a housing for said power coupling including a housing member with a spherical recess and a housing member with a complementary spherical head adapted to detachably engage in said recess so as to permit relative angular displacement of said driving and driven elements while supporting said coupling members in position for driving engagement, said head having a circumferential groove and said recessed housing member having a locking member for engagement in said groove for locking said housing member in co-operative position while permitting relative angular movement of said rotary elements in different planes.

4. In a device of the character described, in combination, a power transmission connection for transmitting power for operation of a portable machine and including a rotary driving element and a rotary driven element, one of which elements is mounted upon said portable machine and movable therewith with respect to the other said rotary element so as to associate said driving and driven elements in power transmitting relation or to disassociate them, a power coupling included in said power connection and having interengaging coupling members, and a housing for said power coupling including a housing member with a spherical recess and a housing member with a complementary spherical head adapted to detachably engage in said recess so as to permit relative angular displacement of said driving and driven elements while supporting said coupling members in position for driving engagement, one of said rotary elements being mounted for adjustment in a vertical plane so as to bring said coupling members into the proper co-operative level.

5. In a device of the character described, in combination, a power transmission connection for transmitting power for operation of a portable machine and including a rotary driving element and a rotary driven element, one of which elements is mounted upon said portable machine and movable therewith with respect to the other said rotary element so as to associate said driving and driven elements in power transmitting relation or to disassociate them, a power coupling included in said power connection and having interengaging coupling members, a housing member with a spherical recess and a housing member with a complementary spherical head adapted to detachably engage in said recess so as to permit relative angular displacement of said driving and driven elements while supporting said coupling members in position for driving engagement, said head having a circumferential groove and said recessed housing member having a locking member for engagement in said groove for locking said housing members in co-operative position while permitting relative angular movement of said rotary elements in different planes, one of said coupling members being adjustable so as to bring it to the proper level for co-operation with the other coupling member.

6. In a device of the character described, in combination, a power transmission connection for transmitting power for operation of a portable machine and including a rotary driving element and a rotary driven element, one of which elements is mounted upon said portable machine and movable therewith with respect to the other said rotary element so as to associate said driving and driven elements in power transmitting relation or to disassociate them, a power coupling included in said power connection and having interengaging coupling members, a housing for said power coupling including a housing member with a spherical recess and a housing member with a complementary spherical head adapted to detachably engage in said recess so as to permit relative angular displacement of said driving and driven elements while supporting said coupling members in position for driving engagement, said head being provided with a recess for receiving the power coupling, and a sleeve connected to said power transmitting connections for rotation therewith and being slidably mounted to effect engagement or disengagement of said coupling members.

7. In a device of the character described, in combination, a power transmission connection for transmitting power for operation of a portable machine and including a rotary driving element and a rotary driven element, one of which elements is mounted upon said portable machine and movable therewith with respect to the other said rotary element so as to associate said elements in power transmitting relation or to disassociate them, a power coupling included in said power connection and having interengaging coupling members, a housing for said power coupling including a housing member with a spherical recess and a housing member with a complementary spherical head adapted to detachably engage in said recess so as to permit relative angular displacement of said driving and driven elements while supporting said coupling members in position for driving engagement, said head being provided with a recess for receiving the power coupling, a sleeve connected to said power transmitting connections for rotation therewith and being slidably mounted to effect engagement or disengagement of said coupling members, an operating rod connected to said sleeve and means to impart angular movement to said operating rod to set it for automatic operation by said driven element, said last mentioned means including a handle connected to said rod and adapted to hold it in operative or idle position 8. In a device of the character described, in combination, a power transmission connection for transmitting power for operation of a portable machine and including a rotary driving element and a rotary driven element, one of which elements is mounted upon said portable machine and movable therewith, with respect to the other said rotary element so as to associate said elements in power transmitting relation or to disassociate them, a power coupling included in said power connection and having interengaging coupling members, a housing for said power coupling including a housing member with a spherical recess and a housing member with a complementary spherical head adapted to detachably engage in said recess so as to permit relative angular displacement of said driving and driven elements while supportnig said coupling members in position for driving engagement, said head being provided with a recess for receiving the power coupling, a sleeve connected to said power transmitting connections for rotation therewith and being slidably mounted to effect engagement or disengagement of said coupling members, an operating rod connected to said sleeve and means to impart angular movement to said operating rod to set it for automatic operation by said driven element, said last mentioned means including a handle connected to said rod by a lost motion connection, whereby said handle may operate by gravity to retain said rod in operative or in idle position.

9. In a power transmission mechanism, in combination, driving and driven members, clutch members connected with said driving and driven members and being adapted to cooperate for transmission of power, mechanism for throwing said clutch members into or out of power-transmitting relation, housings for said clutch members engaging with each other to support said coupling members in position for power-transmitting engagement, said housings having complementary engaging faces cooperating to permit relative angular displacement of said driving and driven members in different planes while supporting said coupling members in position for power transmission thereby, and securing mechanism for securing said coupling housings in cooperative engagement.

10. In a power transmission mechanism, in combination, driving and driven members, clutch members connected with said driving and driven members and being adapted to cooperate for transmission of power, mechanism for throwing said clutch members into or out of power-transmitting relation, housings for said clutch members engaging with each other to support said coupling members in position for power-transmitting engagement, said housings having complementary engaging faces cooperating to permit relative angular displacement of said driving and driven members in different planes while supporting said coupling members in position for power transmission thereby, and securing mechanism for securing said coupling housings in cooperative engagement, said securing mechanism including a circumferential groove formed in one of said housings and a retractable lug on another housing cooperating with said groove 11. In power transmisison connections, the combination with a driving power element, a driven element and a power-coupling for establishing or interrupting the driving connections between the driving and driven elements, of a sleeve connected to one element of said clutch and slidably mounted on a shaft of the power connections and having an internal slot or key-way, a key firmly anchored on said shaft against longitudinal movement and engaging in said key-way to permit longitudinal sliding movement of said sleeve but constraining it for rotation with the shaft, said sleeve being formed of a plurality of detachably connected sections, one of which lies wholly at one end of the key and one having a peripheral groove, and an operating member engaging in said groove.

12. In power transmission connections, the combination with a driving power element, a driven element and a power coupling for establishing or interrupting the driving connections between the driving and driven elements, of a sleeve connected to one element of said clutch and slidably mounted on a shaft of the power connections and having an internal slot or key-way, a key firmly anchored on said shaft against longitudinal movement and engaging in said key-way to permit longitudinal sliding movement of said sleeve but constraining it for rotation with the shaft, an operating member connected to said sleeve, cooperative lugs on said operating member and said driven laundry element, an operating handle for said operating member for manually positioning said lugs for cooperation or for non-cooperation, and disposed to maintain by gravity the lugs in either position.

13. In a power transmission mechanism in combination, driving and driven members, clutch members connected with said driving and driven members and adapted to cooperate for transmission of power, a clutch operating member connected to one of said clutch members, and a handle for setting said clutch operating member for automatic clutch operation by said driven member, said handle being disposed so as to hold by gravity the clutch operating member in operative or in inoperative position.

14. In a power transmission mechanism in combination, driving and driven members, clutch members connected with said driving and driven members and adapted to cooperate for transmission of power, a clutch operating member connected to one of said clutch members, a swinging handle having a lost motion connection to said operating member for permitting angular movement with reference thereto so as to move idly for a part of its swing and subsequently to set said operating member for automatic clutch operation by said driven member, said handle being disposed to hold the operating member by gravity in idle or in clutch operating position.

15. In a power transmission mechanism in combination, driving and driven members, clutch members connected with said driving and driven members and adapted to cooperate for transmission of power, a clutch operating member connected to one of said clutch members, a handle for setting said clutch operating member for automatic clutch operation by said driven member, said handle being disposed so as to hold by gravity the clutch operating member in operative or in inoperative position, and means to yieldingly bring said driving member to a stop in a predetermined position when the clutch is released.

16. In a power transmission mechanism in combination, driving and driven members, a clutch, including clutch members adapted to cooperate for transmission of power, a clutch operating member connected to one of said clutch members, cooperative lugs between said driven member and said clutch operating member, a handle for setting said clutch operating member to bring said lugs into position for automatic clutch operation by said driven member, and means to cushion movement of said clutch operating member to yieldingly bring said driven member to stop in a predetermined position after clutch release.

17. In a power transmission mechanism in combination, driving and driven members, clutch members adapted to cooperate for transmission of power, a clutch operating member connected to one of said clutch members, cooperative lugs between said driven member and said clutch operating member, a handle for setting said clutch operating member to bring said lugs into position for automatic clutch operation by said driven member, and means to cushion movement of said clutch operating member to yieldingly bring said driven member to stop in a predetermined position after clutch release and to automatically throw in said clutch when said lugs are separated, said handle being disposed to hold said clutch operating member in either operative or inoperative position.

18. In a power transmission mechanism, in combination, driving and driven members, a clutch including clutch members adapted to cooperate for transmission of power, a slidable clutch operating member connected to one of said clutch members, means operated automatically by said driven member to slide said clutch operating member and thereby release said clutch and a spring to cushion sliding movement of said clutch operating member and thereby yieldingly bring said driven member to a stop at a predetermined position thereof.

19. In a power transmission mechanism, in combination, driving and driven members, a clutch including clutch members adapted to co-operate for transmission of power, clutch operating means operatively connected to one of said clutch members and shiftable into operative and inoperative position, means for automatically operating said clutch operating means when in operative position to operate said clutch and gravity means for retaining said clutch operating means in operative or inoperative position.

20. In a power transmission mechanism, in combination, driving and driven members, a clutch including clutch members adapted to co-operate for transmission of power, clutch operating means including a longitudinally slidable rod having an operating lug and being rotatable to bring said lug into operative or inoperative position, a lug connected to said driven member and adapted to co-operate with said first mentioned lug to slide said rod to effect automatic disengagement of said clutch members, and a spring to yieldingly restrain longitudinal sliding movement of said rod.

In testimony whereof I affix my signature.

FREDERIC H. EHNTS.